United States Patent [19]

Reil

[11] 3,948,720

[45] Apr. 6, 1976

[54] WELDING JAW

[75] Inventor: Wilhelm Reil, Bensheim-Auerbach, Germany

[73] Assignee: Altstaedter Verpackungs-Vertriebs GmbH, Pfungstadt, Germany

[22] Filed: July 29, 1974

[21] Appl. No.: 492,431

[30] Foreign Application Priority Data

Aug. 10, 1973 Germany............................ 2340557

[52] U.S. Cl. ................... 156/583; 29/469; 156/498; 219/10.81
[51] Int. Cl.² .......................................... B32B 31/20
[58] Field of Search ........... 156/582, 580, 583, 498; 219/10.81; 29/469

[56] References Cited
UNITED STATES PATENTS

| 2,621,704 | 12/1952 | Langer................. | 156/498 |
| 3,234,072 | 2/1966 | Dreeben................. | 156/498 |
| 3,272,674 | 9/1966 | Sachs et al.............. | 156/498 |
| 3,399,291 | 8/1968 | Limbach................ | 156/498 |
| 3,692,613 | 9/1972 | Pederson............... | 156/498 |
| 3,703,427 | 11/1972 | Sellers et al........... | 156/583 |

*Primary Examiner*—Edward G. Whitby

[57] ABSTRACT

A welding jaw for thermoplastics material comprises a cooled carrier with two parallel heating elements on one surface. At least part of the surface of the carrier is so spaced from the surfaces of the elements that on welding, material flows from under the element to be cooled and hardened on contacting the surface part. Thus allows rapid firm welding and is particularly useful in transverse welding of liquid filled tubes.

13 Claims, 3 Drawing Figures

U.S. Patent April 6, 1976 3,948,720
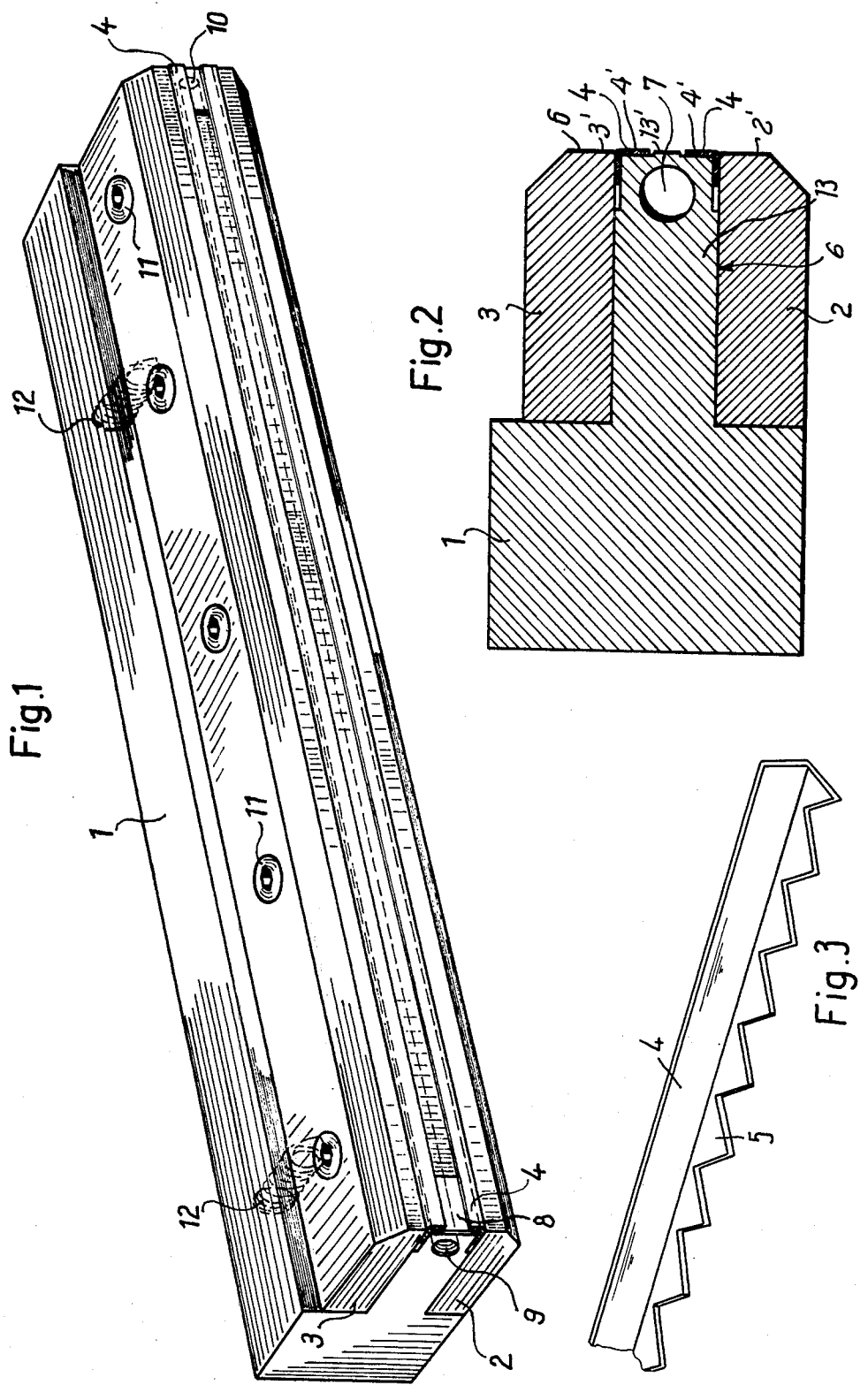

WELDING JAW

This invention relates to a welding jaw for use in apparatus for welding material, such as thermoplastics material, or paper, cardboard or plastics material coated with thermoplastics material. The welding jaw is particularly useful when the material is in the form of a tube filled with liquid. Welding apparatus can be provided with two such welding jaws, or one such welding jaw and a counter-pressure jaw, which when brought together will force the liquid out of the welding zone immediately prior to the welding operation.

It is common to weld together two or more layers of thermoplastics material such as polyethylene by pressing them together and at the same time heating them to a sufficiently high temperature to cause their surfaces to fuse together. In modern high-duty packaging machines, use is often made of pulse welding, i.e. heat is applied in pulses to the welding zone in quantities that are so selected that the required strength of weld is achieved without the packaging material becoming burned or otherwise damaged by heat.

It is known to carry out pulse welding with the aid of welding jaws of which at least one consists of a carrier, an insulating material applied thereto, and a heating strip secured to the insulating material, the ends of the strip being connectable to an electric current source. The source delivers current in pulses when heat pulses are to be produced in the heating strip. In order to take advantage of the advantages of pulse welding, the heating strip has to be rapidly raised to the welding temperature and thereafter rapidly cooled to a lower temperature. This requires the strip to have low thermal efficiency, and this can be provided by making the strip thin. It has been found to be important for the strip be firmly secured to the carrier, since otherwise expansion of the strip during heating causes it to move from its predetermined position and soon become burned, because uniform dissipation of heat over its length cannot be achieved. Known welding jaws cannot be used successfully for rapid transverse sealing of tubes pre-filled with liquid. In such welding a tube is filled with liquid, and passed between two welding jaws or a welding jaw and a counter-pressure jaw in order to be sealed. If the apparatus were operated rapidly, when the known welding jaws were brought together, the weight of the liquid located above the previously welded seam would immediately break open that seam, which would not have become sufficiently hardened in the interval since it was formed.

According to the present invention, there is provided a welding jaw including a carrier of thermally conductive material, two parallel heating elements on the surface of the carrier and electrically insulated therefrom, the part of the surface of the carrier between the elements being at a greater distance from the surfaces of the elements than further parts of the surface of the carrier located laterally of the elements, and means to cool the carrier, such that when the elements contact, compress and weld thermoplastics material in a welding zone, softened material contacts at least said further parts of the surface of the carrier, to be cooled, and thus hardened, thereby.

In one form the elements are L-shaped strips having first limbs contacting the surface of the carrier and second limbs securely located in grooves of the carrier. Welding apparatus equipped with such a jaw or jaws can allow the formation of transverse seams in pre-filled tubes at a very high rate and at precisely defined positions. Each of the seams is so hardened and strengthened that the weight of the liquid in the packaging tube above the seam will not damage the seam.

Preferably, the carrier comprises a central portion and a clamping bar detachably secured to each side, the clamping bars defining the grooves with the central portion and the surfaces of the clamping bars comprising said further surfaces. The jaw has a recess between the two elements, and between the grooves receiving the elements. In use, in sealing a tube filled with liquid, the liquid can be forced out of the welding zone immediately prior to the welding operation when the welding jaws are brought together. Outwardly of the elements, the abovementioned further parts or the surfaces of the clamping bars, are nearer the height of the faces of the element than is the recess between the elements. This provides a support effect for material to be welded, as well as the cooling effect.

The preferably L-shaped heating strips have surfaces parallel to the surface of the carrier, and farthest forward in the forward direction of the jaw.

In use, when the jaw is urged towards a support, or when two such welding jaws are brought together for a welding operation, the surfaces of the heating elements are first to come into contact with the material to be welded, and contact occurs before heating takes place. As the jaws are moved closer together, the said further surfaces, on the clamping bars when provided, press against the material. During further advance the recesses between the elements approach each other to an extent allowing liquid in the tube to be forced just out of the welding zone. At this instant heating of the heating elements begins, and the elements become hot and are brought together under the effect of further pressure. This causes softening of the thermoplastics material (e.g. polyethylene) which is squeezed outwards from between the elements. The squeezed out material is cooled by the surface of the carrier in the recess and the further surfaces outwards of the elements. The clamping bars, where provided, perform a cooling action, and so the welded seam is hardened by this cooling even during the heating period. The recess between the elements and the further surfaces outwards of the elements act as support and pressure distributing surfaces so that such a high pressure will not build up between the heating elements such as might cause the liquid thermoplastics material to be completely squeezed out of the zone of the welded seam.

It will be appreciated that immediately after the welding jaws have been opened after sealing, a hardened welded seam is made which could withstand, for instance, the load imposed by a column of liquid.

It is preferred for ducts to be provided for circulation of a coolant in the carrier. The ducts can ensure that cooling takes place rapidly so that hardening of the welded seam is promoted and the welding jaws are quickly ready for the next welding operation.

It is also preferred to provide that part of each heating strip that is clamped between the carrier and the clamping bars with a row of holes or with serrations since only those limbs of the L-shaped heating elements that bear on the front face of the carrier need to be heated. The clamped limb of each strip should remain as cool as possible. Holes, recesses, serrations or the like in the clamped limb of each element reduce the development of heat.

The heating elements may consist of a stamped sheet-metal strip of U-shaped cross-section. The production of such a heating strip is simple and can be carried out with great dimensional precision. Alternatively two L-shaped elongate heating strips can be soldered at their ends to a metal plate, or can be firmly clamped on the carrier together with loosely inserted contact pieces of U-shaped cross-section. The contact pieces, whether made integrally with the L-shaped heating strips or not, are preferably so fitted to the heating elements and then to the carrier that the front contact surface of the jaw is always formed by the limbs of the L-shaped heating strips which lie flat on the carrier. This is important for enabling two welding jaws to be brought directly together and sealing to be carried out. Otherwise, the contact pieces, projecting farther forward, might get in the way. Advantageously recesses may be provided at the outer ends of the carrier and/or of the clamping bars so as to reduce the amount of additional material needed for providing the contact pieces.

The invention will be more clearly understood from the following description of one exemplary embodiment given with reference to the accompanying drawings, in which:

FIG. 1 is a perspective view of a jaw according to the invention;

FIG. 2 is a section through the jaw of FIG. 1; and

FIG. 3 is a perspective view of part of a special heating element.

Referring to FIGS. 1 and 2 a carrier 1, preferably made of steel, comprises a thinner part 13 projecting from one side of a main, wide, part. Formed in the part 13 are cooling ducts 7 through which a coolant can circulate when an inlet opening 9 and an outlet opening 10 are connected to a coolant source. The carrier 1 is also provided with transverse fixing holes 12 which extend into the carrier and enable the welding jaw to be secured in the welding apparatus of a packaging machine.

Each welding jaw has two clamping bars 2 and 3, which are secured to the part 13 of the carrier 1 by means of screws 11.

As shown in FIG. 2, the outer surface of the part 13 of the carrier 1 and the outer faces of the clamping bars 2 and 3 are provided with insulating material 6. This material may be a ceramic which is applied to the metal by a flame-spraying method; alternatively the insulating material may be mica or a similar electrically insulating and heat-resisting substance. In another form, the electrical insulation can be achieved by chemical treatment of the metallic surface of the carrier 1 and clamping bars.

FIG. 2 also shows heating strips 4 clamped between the part 13 and the clamping bars 2 and 3. The heating strips 4 are electrically insulated both from the carrier 1 and the clamping bars 2 and 3, and can therefore be heated by an electric current without this current passing to the carrier 1 or to the clamping bars 2 and 3.

The heating strips 4 are of L-shaped cross-section, one limb of each strip being securely clamped between the part 13 and a respective clamping bar. The other limbs of the strips contact the outer surface of the part 13 of the carrier. In a preferred embodiment heating strips 4,4 are positioned so that their outer, material contacting surfaces 4',4' are in a plane parallel to, but protruding outwardly from the material contacting surfaces 3',2' of clamping bars 3,2, respectively. Carrier projection part 13, conversely, is seated to clamping bar 2,3 in an offset relationship so that carrier projection surface, 13' is in a plane parallel to, but recessed from both heating strips 4,4 and clamping bar surfaces 2',3'. The resulting arrangement allows material to be welded in the welding operation to first contact surfaces 4',4', secondly clamping bar surfaces 2',3' and finally carrier projection surface 13'.

An advantage of this arrangement is that the heating strips 4 can be readily replaced by loosening the screws 11 so that the clamping bars are released, after which the strips may be removed and replaced by new ones. To enable the heating strips 4 to be conveniently connected to a current source, not illustrated, they are provided with contact pieces 8 which facilitate connection.

For using the welding jaw, the heating strips 4 are clamped between the clamping bars 2 and 3 and the part 13 of the carrier 1. The heating strips 4 should not lie directly on the metal parts of the carrier 1 or of the clamping bars 2 and 3 but should only be in contact with the electric insulation 6. It is expedient to fit the heating strips 4 between the clamping bars 2 and 3 and the carrier 1 in such a way that there is no gap between the unclamped limbs of the heating strips 4 and the outer surfaces of the clamping bars 2 and 3. When the heating strips 4 have been fitted, the screws 11 are tightened until the heating strips are secured in position. The welding jaw may then be secured in the appropriate position in the welding apparatus with the aid of screws which pass through the fixing holes 12, and thereafter the discharge and supply orifices 10 and 9 of the cooling ducts 7 are connected to a coolant pump through hoses, not illustrated. After the welding jaw has been fitted, the heating strips 4 are connected by their contact pieces to a current source which provides current surges of brief duration and high current-strength.

The heat generated in the clamped part 5 of each heating strip 4 is not used for the actual welding operation but has to be dissipated through the coolant. To reduce thermal losses, it is preferred to provide each clamped part 5 with perforations, or with a serration as shown in FIG. 3. In this way the area that gives off heat is reduced, and the quantity of heat generated in the clamped part 5 of each heating strip 4 is decreased. The consequent reduction in the mechanical strength of the arrangement is negligible.

It has been found that the welding jaw in accordance with the invention enables good sealing to be achieved and that it has a long service life; also the heating strips 4 can be positioned with great accuracy in the welding jaw. In addition, the welding jaw can be produced in a simple and economic manner.

I claim:

1. A welding jaw comprising a carrier of thermally conductive material, a surface to said carrier, two spaced apart parallel heating elements on said surface, said elements having outer surfaces remote from the carrier and being electrically insulated from said carrier, the part of said surface of said carrier which lies between said elements being at a greater distance from said outer surfaces of said elements than further parts of said surface of the carrier located laterally of said elements, and means to cool the carrier, whereby, when said elements contact, compress and weld thermoplastics material in a welding zone, softened material contacts at least said further parts of said surface of said carrier, to be cooled, and thus hardened, thereby.

2. A welding jaw as claimed in claim 1 wherein said elements comprise L-shaped strips, first limbs of said strips contacting said surface of said carrier and second limbs of said strips being securely located in grooves in said carrier.

3. A welding jaw as claimed in claim 2 wherein said carrier comprises a central portion having two sides and a clamping bar detachably secured to each of said sides, said clamping bars together with said sides defining said grooves.

4. A welding jaw as claimed in claim 2 wherein said elements are electrically interconnected.

5. A welding jaw as claimed in claim 4 including a plate, said elements being soldered to said plate.

6. A welding jaw as claimed in claim 4 including a U-shaped conductor having a limb extending into each groove, said conductor electrically connecting said elements.

7. A welding jaw as claimed in claim 4 wherein said elements are formed by stamping from an initially U-shaped channel.

8. A welding jaw as claimed in claim 1 wherein said carrier is of metal and including an electrically insulating surface to said carrier.

9. A welding jaw as claimed in claim 8 wherein said surface of said carrier has been rendered insulating by chemical treatment.

10. A welding jaw as claimed in claim 2, wherein said second limbs of the elements are perforated.

11. A welding jaw as claimed in claim 2 which said second limbs of the elements are serrated.

12. A welding jaw comprising a carrier of thermally conductive material, said carrier including a carrier projection part with a material contacting surface, a pair of clamping bars each with a material contacting surface and which seat with said carrier projecting part, two spaced apart, parallel heating elements on said carrier projecting surface, said elements each having an inner carrier contacting surface and an outer material contacting surface, said heating elements being electrically insulated from the carrier and being positioned spaced apart from each other, their outer material contacting surface protruding outwardly in a plane parallel to the plane of the surface of the carrier projecting part forming thereby a recess with the carrier projecting part, means to cool said carrier, so that, when said elements contact, compress and weld thermoplastic material in a welding zone, the softened material is urged toward and contacts said material contacting surface of said carrier projection part whereby it is cooled, and thus hardened.

13. A welding jaw according to claim 12 in which the clamping bars seat with the carrier projection part so that the respective material contacting surfaces of the clamping bars are in the same plane as each other but are offset from and parallel to the plane of the carrier project in part so that when said jaw is operatively engaged, material to be welded first contacts said elements, then said clamping bar surfaces, and finally said carrier projecting surface.

* * * * *